United States Patent [19]

Castleman

[11] Patent Number: 4,945,244
[45] Date of Patent: Jul. 31, 1990

[54] ELECTRONIC INFRARED DETECTOR

[76] Inventor: Robert D. Castleman, E. 1311 Glass, Spokane, Wash. 99207

[21] Appl. No.: 289,327

[22] Filed: Dec. 23, 1988

[51] Int. Cl.$^5$ .............................. G01J 5/00; G01J 5/10
[52] U.S. Cl. .............................. 250/370.01; 250/338.1; 250/339
[58] Field of Search ................. 250/338.1, 339, 370.01

[56] References Cited
U.S. PATENT DOCUMENTS

| | | | |
|---|---|---|---|
| 2,976,419 | 3/1961 | Menke et al. | 250/338.1 |
| 3,919,631 | 11/1975 | Brown | 250/338.1 |
| 4,178,522 | 12/1979 | MacLennan et al. | 250/338.1 |
| 4,204,120 | 5/1980 | Ribaulet et al. | 250/341 |
| 4,207,466 | 6/1980 | Drage et al. | 250/338.1 |
| 4,271,358 | 6/1981 | Schwarz | 250/338.1 |
| 4,550,254 | 10/1985 | Zomorrodi et al. | 250/338.1 |

OTHER PUBLICATIONS

Memorex Corporation, *Memorex CP$^6$ Universal Remote Control Owner's Manual*, pp. 3-35.
Sony Corporation, *Sony Video Cassette Recorder Beta hi-fi SL-2700/2700B*, 1983, pp. 2-43.

Primary Examiner—Constantine Hannaher
Assistant Examiner—Jacob M. Eisenberg
Attorney, Agent, or Firm—Jerry T. Kearns

[57] ABSTRACT

An infrared sensing device is capable of sensing the amount of infrared radiation which is present at a given location and presenting a visual indicia of the strength of the signal. A series of led's which light up in a bar graph fashion indicate the strength of the signal. The device also has a remote sensor which allows the sensing to be done at a location away from the position of the visual signal strength indicator.

2 Claims, 1 Drawing Sheet

ELECTRONIC INFRARED DETECTOR

BACKGROUND OF THE INVENTION

1. Field of the Invention

The present invention relates to electronic infrared detectors, and more particularly pertains to the field of infrared light detection.

In the field of infrared light detection there is a need for a new and inexpensive way to detect and measure the strength of an infrared beam of light. With the increased usage of infrared light in remote control units for home electronics, it is important to know whether or not the beam from the remote control unit is operating correctly. One way of knowing whether or not the unit is operating correctly is to measure the relative strength of the beam which is sent when a button is pushed. The current state of the art measurement devices only tell whether or not the unit is operating and give no indication of the power being sent by the beam. This could lead to a faulty diagnosis of the problem or the unnecessary replacement of the remote when in fact it was merely operating in a substandard fashion and could be repaired. Applicant's invention provides a new, low cost method of measuring both the presence and strength of an infrared beam. This allows more efficient and inexpensive methods of error diagnosis and repair.

2. Description of the Prior Art

Various types of electronic infrared detectors are known in the prior art. A typical example of such an electronic infrared detector is to be found in U.S. Pat. No. 4,550,254 which issued to Zomorrodi et al. The Zamorrodi patent shows the use of a circuit which measures the amount of infrared light which is reflected from the surface of a drum in a copier type machine. U.S. Pat. No. 4,271,358 which issued to Schwarz shows the use of an infrared detector which is selective in the frequencies of light which it will detect. The intended environment of this device is in a burglar alarm. U.S. Pat. No. 4,207,466 which issued to Drage et al shows the use of an infrared detector in a proximity location circuit. In the use disclosed, the device does not measure the strength of the beam, only whether or not it is present. U.S. Pat. No. 4,204,120 which issued to Riboulet et al discloses the use of a device which measures the amount of absorption of infrared light by the surface of an object. The device is not concerned with the measurement of an independent source of infrared light. U.S. Pat. No. 4,178,522 shows the use of a detailed circuit to remove the background clutter from an infrared detector. The purpose of the device is to map or measure an area by the use of infrared radiation.

While the above mentioned devices are suited for their intended usage, none of these devices are suitable for use in testing infrared remote controls and the determination of the effectiveness of the same. Applicant's invention deals with the field of servicing a device which is controlled by an infrared remote control. Frequently with such systems, the infrared source may be functioning, but at a reduced level of efficiency. The current method of testing such devices by use of a chemical patch that reacts to the light is insufficient because it only detects the presence of the infrared light. It tells the technician only that the device is functioning, not how well. Applicant's invention solves this problem by giving a visual readout by use of led's to indicate the strength of the signal. This allows a technician to more fully trouble-shoot the system. Inasmuch as the art is relatively crowded with respect to these various types of electronic infrared detectors, it can be appreciated that there is a continuing need for and interest in improvements to such electronic infrared detectors, and in this respect, the present invention addresses this need and interest.

SUMMARY OF THE INVENTION

In view of the foregoing disadvantages inherent in the known types of electronic infrared detectors now present in the prior art, the present invention provides an improved electronic infrared detector. As such, the general purpose of the present invention, which will be described subsequently in greater detail, is to provide a new and improved electronic infrared detector which has all the advantages of the prior art electronic infrared detectors and none of the disadvantages.

To attain this, representative embodiments of the concepts of the present invention are illustrated in the drawings and make use of an infrared sensing device which has several parts. The device is capable of sensing the amount of infrared radiation which is present at a given location and presenting a visual indicia of the strength of the signal. This is done through the use of a series of led's which light up in a bar graph fashion to indicate the strength of the signal.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved electronic infrared detector which has all the advantages of the prior art electronic infrared detectors and none of the disadvantages.

It is another object of the present invention to provide a new and improved electronic infrared detector which may be easily and efficiently manufactured and marketed.

It is a further object of the present invention to provide a new and improved electronic infrared detector which is of a durable and reliable construction.

An even further object of the present invention is to provide a new and improved electronic infrared detector which is susceptible of a low cost of manufacture with regard to both materials and labor, and which accordingly is then susceptible of low prices of sale to the consuming public, thereby making such electronic infrared detectors economically available to the buying public.

Still yet another object of the present invention is to provide a new and improved electronic infrared detector which provides in the apparatuses and methods of the prior art some of the advantages thereof, while simultaneously overcoming some of the disadvantages normally associated therewith.

Still another object of the present invention is to provide a new and improved electronic infrared detector which allows the measurement not only of the presence of an infrared signal, but the strength of the signal.

Yet another object of the present invention is to provide a new and improved electronic infrared detector in which the strength of the signal is displayed by use of a visual indicia.

Even still another object of the present invention is to provide a new and improved electronic infrared detector in which the visual indicia is a bar graph type display composed of led's which are readily readable in a variety of lighting conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
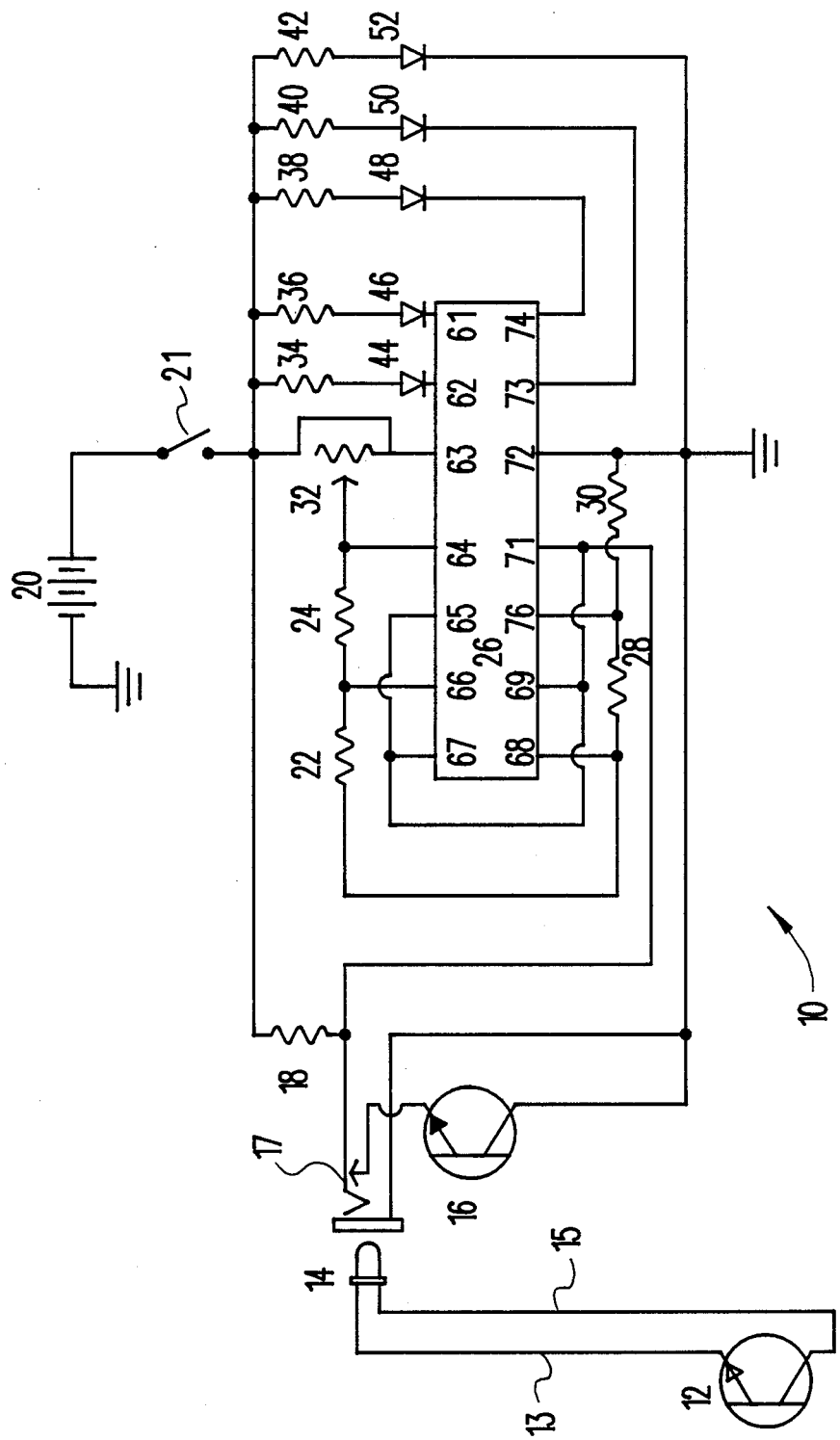
FIG. 1 is a view of a circuit diagram of the infrared detector which is the subject of the application.

With reference now to the drawings, and in particular to FIG. 1 thereof, a new and improved electronic infrared detector embodying the principles and concepts of the present invention and generally designated by the reference numeral 10 will be described.

More specifically, it will be noted that the first embodiment 10 of the invention includes a main circuit chip 26 which is of the type known in the industry as an IC. The particular IC utilized is an LM339. The IC and the associated circuitry are contained in a housing which is not shown. In addition to the IC, the housing contains a nine volt battery 20 which provides power for the device when the switch 21 is closed. The device includes a phototransistor or sensor 16 which is sensitive to light in the infrared range. The phototransistor 16 may be a RADIO SHACK 270-142, or equivalent. When infrared light hits the transistor it produces a current which is proportional to the amount of light which is incident on the surface of the transistor. When the current is produced it is transported to the IC by the wiring harness. When the current reaches the IC, it is processed and produces output voltages at each of the IC connections 62,61,74 and 73 respectively as the output current of the phototransistor 16 increases. Thus, the IC 26 monitors the current level produced by the phototransistor 16 and sequentially activates the LEDs 44,46,48 and 50 as the current level increases. The LEDs 44,46,48,50 which are connected to the IC connections will light up in order like a bar graph in response to progressively greater amounts of light on the phototransistor. A fifth LED 52 is merely a power on light to indicate that the unit has been switched on. Each of the LEDs is connected to a complementary resistor 34,36,38,40,42 which serve to limit the amount of voltage the LED's are allowed to receive. The remaining connections to the IC 63, 64, 65, 66, 67, 68, 69, 70, 71 and 72 are biased to a high state by a connection to the battery 20. This is done by use of a series of resistors 22,24,28,30,32 which in turn are connected to the battery 20. The value of the various resistors is as follows:

| RESISTOR | VALUE (K OHMS) |
| --- | --- |
| 18 | 20 |
| 22 | 4.7 |
| 24 | 4.7 |
| 28 | 4.7 |
| 30 | 4.7 |
| 32 | 100 potentiometer |
| 34 | 1 |
| 36 | 1 |
| 38 | 1 |
| 40 | 1 |
| 42 | 1 |

In addition to the primary phototransistor 16, there is a second phototransistor 12, identical to the phototransistor 16, which can be connected to the device through the use of elongated leads 13 and 15 and jack 14. When the male part of the jack is mated with the female receptacle, it activates the second phototransistor 12 and deactivates the primary phototransistor 16 by a spring steel switch 17. This allows the remote sensor 12 to be placed easily in any location needed while still allowing the main unit to be placed in a convenient position in which the technician can see the LEDs. In such a manner, the device is much more flexible in use than it would be without to remote sensor.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved electronic infrared detector comprising:
    a housing;
    an integrated circuit in said housing;
    a first phototransistor, sensitive to radiation in the infrared range, connected to said integrated circuit;
    a battery in said housing operatively connected to said integrated circuit;
    a series of light emitting diodes arranged in a bar graph like fashion in said housing;
    a first connector in said housing;
    a second phototransistor sensitive to radiation in the infrared range, said second phototransistor connected by elongated leads to a second connector for engagement with said first connector; and
    means for deactivating said first phototransistor and for activating said second phototransistor upon engagement of said first and second connectors;
    said integrated circuit including means for producing a plurality of discrete output voltages in response to changes in intensity of infrared radiation incident on said first or second phototransistor and transmitting said output voltages to each of said light emitting diodes in turn; and
    said light emitting diodes operatively connected to said integrated circuit such that said light emitting diodes light up in sequence in response to progressively greater amounts of infrared radiation incident on said first or second phototransistor.

2. A new and improved electronic infrared detector comprising:
    a housing;
    a first phototransistor in said housing, said first phototransistor sensitive to radiation in the infrared range,
    a first connector in said housing;
    a second phototransistor connected by elongated leads to a second connector for engagement with said first connector, said second phototransistor sensitive to radiation in the infrared range;
    means for deactivating said first phototransistor and for activating said second phototransistor upon engagement of said first and second connectors;
    circuit means for producing a plurality of discrete output voltages in response to changes in intensity of infrared radiation incident on said first or second phototransistor; and
    display means operatively connected to said circuit means, said display means including a plurality of light emitting elements sequentially illuminated by said discrete output voltages.

* * * * *